(12) United States Patent
Huang et al.

(10) Patent No.: US 10,399,694 B2
(45) Date of Patent: Sep. 3, 2019

(54) RAM AIR TURBINE SYSTEM

(71) Applicant: GE Aviation Systems LLC, Grand Rapids, MI (US)

(72) Inventors: Hao Huang, Troy, OH (US); Xiaochuan Jia, Centerville, OH (US); Lanchao Lin, Dayton, OH (US)

(73) Assignee: GE Aviation Systems LLC, Grand Rapids, MI (US)

( * ) Notice: Subject to any disclaimer, the term of this patent is extended or adjusted under 35 U.S.C. 154(b) by 586 days.

(21) Appl. No.: 14/843,718

(22) Filed: Sep. 2, 2015

(65) Prior Publication Data
US 2017/0057655 A1 Mar. 2, 2017

(51) Int. Cl.
*H02K 9/16* (2006.01)
*B64D 41/00* (2006.01)

(52) U.S. Cl.
CPC ........ *B64D 41/007* (2013.01); *F05D 2220/34* (2013.01); *F05D 2260/208* (2013.01); *Y02E 10/72* (2013.01); *Y02T 50/44* (2013.01); *Y02T 50/675* (2013.01)

(58) Field of Classification Search
CPC ............. B64D 41/007; F05D 2260/208; F05D 2220/34
USPC ............................ 310/58; 290/43, 44, 54, 55
See application file for complete search history.

(56) References Cited

U.S. PATENT DOCUMENTS

| 6,127,758 A | 10/2000 | Murry et al. |
| 6,692,240 B1 * | 2/2004 | Leonhard ............. F04B 39/066 310/62 |
| 8,459,966 B2 | 6/2013 | Hipskey et al. |
| 8,864,448 B2 | 10/2014 | Tanjea et al. |
| 2006/0059941 A1 | 3/2006 | Merritt et al. |
| 2010/0310361 A1* | 12/2010 | Carre ...................... F03D 1/025 415/199.5 |
| 2011/0089693 A1* | 4/2011 | Nasiri ................... F03D 7/0272 290/44 |
| 2012/0114463 A1 | 5/2012 | Beers et al. |
| 2013/0048780 A1 | 2/2013 | Masoudipour et al. |
| 2013/0071232 A1* | 3/2013 | Taneja ................. B64D 41/007 415/122.1 |
| 2013/0181565 A1* | 7/2013 | Petro ........................ H02K 1/02 310/156.33 |
| 2013/0234554 A1* | 9/2013 | Tanaka ................. H02K 21/145 310/156.02 |

(Continued)

FOREIGN PATENT DOCUMENTS

| CN | 203569707 U | 4/2014 |
| EP | 2 985 225 A1 | 2/2016 |

(Continued)

OTHER PUBLICATIONS

Combined Search and Examination Report issued in connection with corresponding GB Application No. 1614689.6 dated Feb. 20, 2017.

(Continued)

*Primary Examiner* — Terrance L Kenerly
(74) *Attorney, Agent, or Firm* — McGarry Bair PC

(57) ABSTRACT

A ram air turbine system includes a rotatable shaft, a housing having a body defining an interior, a generator located within the interior and having a stator and a rotor, and a turbine having a first set of blades operably coupled with the rotatable shaft and configured such that airstream passing through the first set of blades rotates the shaft.

19 Claims, 5 Drawing Sheets

(56) References Cited

U.S. PATENT DOCUMENTS

2013/0257053 A1 10/2013 Russ et al.
2014/0368064 A1 12/2014 Fedoseyev et al.

FOREIGN PATENT DOCUMENTS

JP    S62-262631 A   11/1987
WO    00/38985 A2    7/2000

OTHER PUBLICATIONS

Machine Translation and a First Office Action and Search issued in connection with corresponding CN Application No. 201610774224.7 dated Jul. 20, 2017.
Machine Translation and a Notification of Reasons for Refusal issued in connection with corresponding JP Application No. 2016-159775 dated Aug. 22, 2017.

* cited by examiner

RAM AIR TURBINE SYSTEM

BACKGROUND OF THE INVENTION

Ram Air Turbine (RAT) systems are used in contemporary aircraft as emergency or supplemental power systems. They typically have a turbine, with a rotating hub and a plurality of blades, operably coupled to an electric generator to provide the driving source for the generator. Initially in flight they are stowed in a compartment of the aircraft fuselage, covered by a compartment door. When needed as a source of emergency or supplemental power, the RAT system is deployed from the fuselage into the surrounding airstream, which drives the blades to rotate the generator to extract energy from the airstream. As power requirements for aircraft systems increase, the power generation capabilities of RAT systems continue to increase.

RAT systems can also be configured to operate in predetermined conditions, such as when exposed to environmental debris, such as volcanic ash. In such a configuration, RAT systems can be fully enclosed or sealed to prevent the debris from entering the generator, where it can cause machine performance degradation or malfunction. However, such enclosing or sealing can interfere with active or passive cooling systems, for example, liquid coolant systems, as such sealing can prevent, inhibit, or interfere with conventional cooling or heat removal pathways. Specifically, difficulty in cooling the rotor can lead to reduced generator performance or generator failure.

BRIEF DESCRIPTION OF THE INVENTION

In one aspect, a ram air turbine system includes a thermally conductive rotatable shaft, a housing having a body defining an interior, a generator located within the interior and having a stator and a rotor, wherein the rotor is operably and thermally coupled with the shaft, a turbine having a first set of blades operably coupled with the rotatable shaft and configured such that airstream passing through the first set of blades rotates the shaft, and a second set of blades downstream from, and external to the housing, wherein the second set of blades are thermally coupled with the shaft and configured such that airstream passing through the second set of blades provide for heat transfer to the airstream.

In another aspect, a heat exchanger for a ram air turbine generator includes a stator having a first set of windings, a rotor having a second set of windings and configured to rotate about a thermally conductive shaft relative to the stator, configured to generate a current in the first set of windings, and a set of blades thermally and rotationally coupled with the rotor by way of the thermally conductive shaft, and configured such that the blades are exposed to the airstream passing the ram air turbine. The heat exchanger conducts heat from the rotor, through the thermally conductive shaft, to the set of blades, and whereby the rotating exposure of the set of blades in the airstream provides heat transfer to the airstream.

In yet another aspect, an aircraft includes a ram air turbine generator, wherein the ram air turbine generator further includes a thermally conductive rotatable shaft, a housing having a body defining an interior, a generator located within the interior and having a stator and a rotor, wherein the rotor is operably and thermally coupled with the shaft, a turbine having a first set of blades operably coupled with the rotatable shaft and configured such that airstream passing through the first set of blades rotates the shaft, and a second set of blades downstream from, and external to the housing, wherein the second set of blades are thermally coupled with the shaft. Air flowing about the ram air turbine generator passing through the second set of blades provide for heat transfer from the second set of blades to the air.

DESCRIPTION OF EMBODIMENTS OF THE INVENTION

Embodiments of the invention can be implemented in any environment using a generator. While this description is primarily directed toward a generator providing power generation, it is also applicable to any electric machine providing a driving force or generating electricity. Further, while this description is primarily directed toward an aircraft environment, embodiments of the invention are applicable in any environment using an electric machine.

Figure 1:
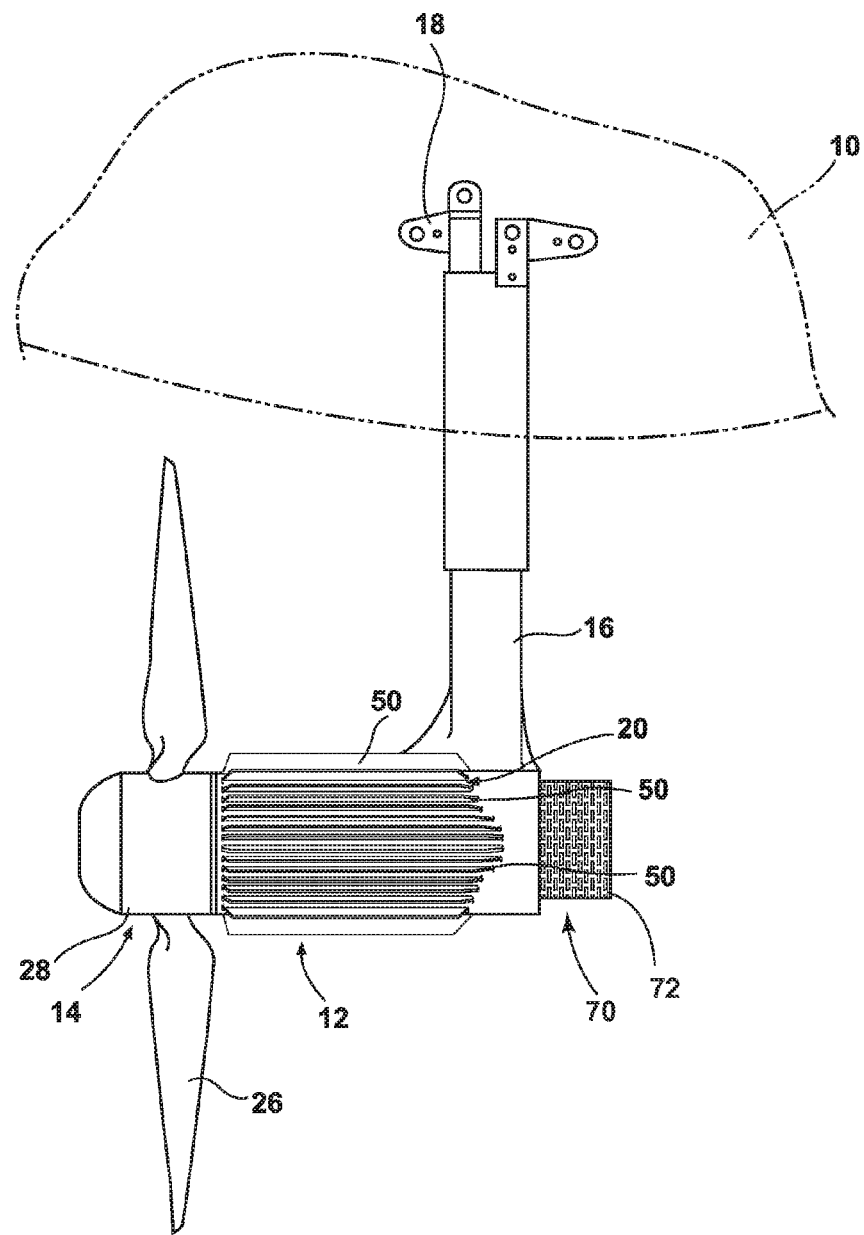
FIG. 1 is a side view illustrating a portion of an aircraft having a ram air turbine in accordance with one embodiment of the invention.

As illustrated in FIG. 1, an aircraft 10 can include a RAT system 12 for generating electrical power for the aircraft 10 when the RAT system 12 is exposed to the airstream exterior of the aircraft 10 and RAT system 12. The RAT system 12 can include a RAT 14, which can be suspended from the aircraft 10 by, in one non-limiting example, a pylon 16 and mounting assembly 18. The RAT system 12 can further include a housing 20 having a body and defining an interior, wherein the housing can additionally include a cooling system or heat exchanger for the RAT 14, illustrated as a set of heat-dissipating fins 50 or cooling blades, located about the housing 20 and configured such that airstream flowing past the fins 50 provides for heat transfer from the RAT system 12 to the airstream. The set of fins 50 can be formed in any suitable manner to provide cooling or heat-dissipation for the RAT system 12. In the illustrated example, the set of fins 50 can project outwardly from a periphery of the housing 20 and can be spaced about the periphery of the housing 20. The size and number of the set of fins 50 can, for example, be a function of the specific heat dissipation requirements of the RAT system 12.

The RAT system 12 additionally includes a turbine in the form of a first set of multiple blades 26 projecting from a propeller 28, external to the housing 20, and configured such that when the blades 26 are exposed to airstream flowing past or through the blades 26, propeller 28, or RAT system 12, the exposure generates rotational movement of the propeller 28. Downstream from the propeller 28 and RAT 14 (i.e. rearward of the RAT 14 in the direction of the airstream), the RAT system 12 can further include a second cooling system 70 or heat exchanger, which can include a shield element 72 for shielding a portion of the second cooling system 70. The second cooling system 70 will be explained below.

The RAT 14 can be stored within a suitable compartment in the fuselage or wing of the aircraft 10 and can be deployed quickly and easily by moving the pylon 16 relative to the mounting assembly 18, thereby moving the RAT system 12 to an exposed position within the airstream flowing past the aircraft 10. Although only two blades 26 have been shown in the illustrated embodiment, it is contemplated that any number of blades 26 can be used. Additionally, the illustrated embodiment of the blades 26 is merely one non-limiting example of a blade 26, propeller 28, or RAT system 12 configurations, and alternative configurations are envisioned. For example, aircraft 10 or RAT systems 12 are envisioned wherein the RAT system 12 is permanently exposed to the airstream.

In another example, the blades 26 can be configured with an alternative shape, design, or skew, for instance, to provide the above-described interaction when exposed to a predetermined airstream, defined by the operating environment of a flying aircraft 10. One non-limiting example of an operating environment of a flying aircraft 10 can include an altitude of 45,000 feet, wherein the air density of an airstream can be 20% of the air density compared to sea level.

Figure 2:
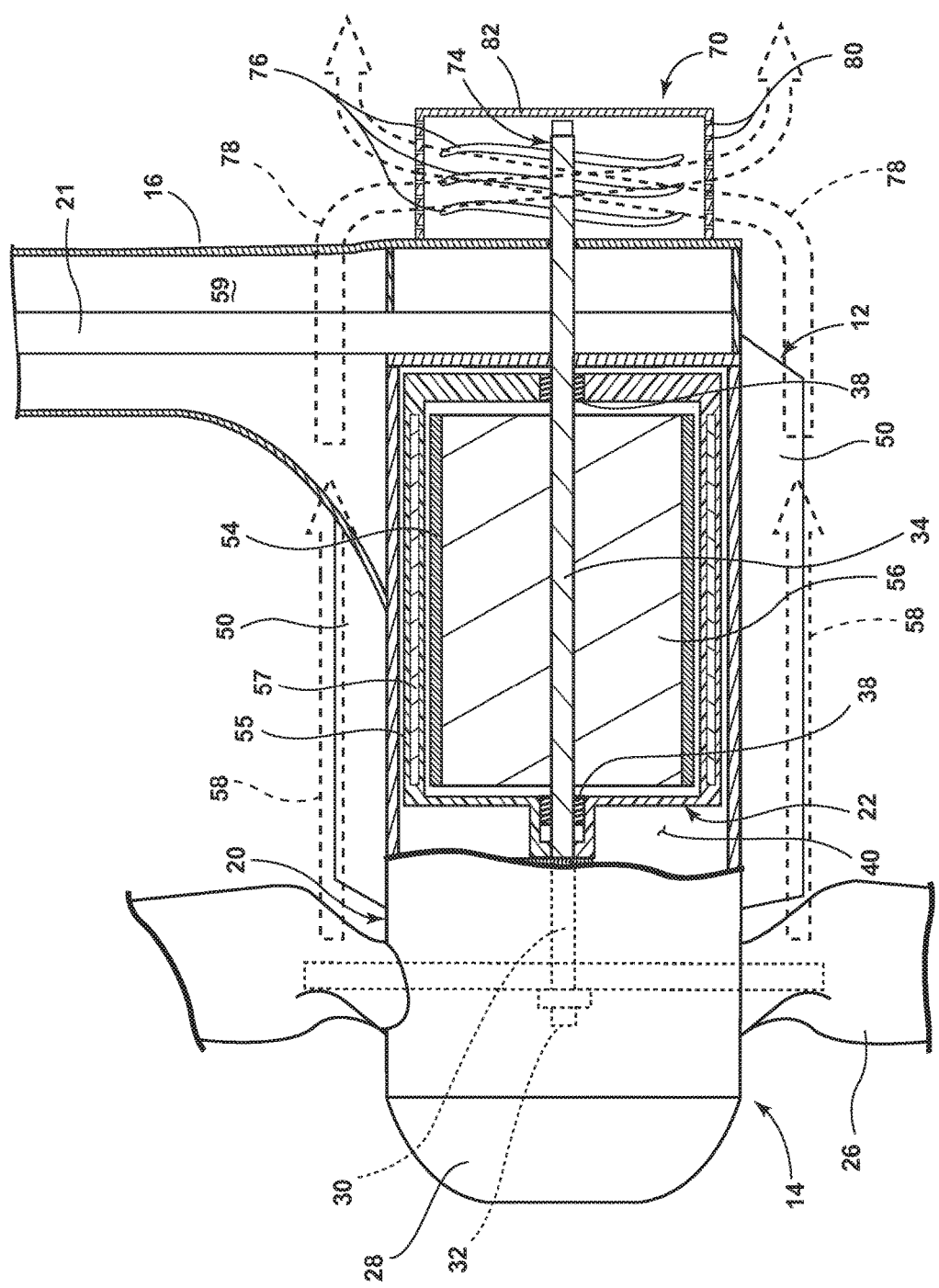
FIG. 2 is a schematic cross sectional view of the ram air turbine of FIG. 1.

As illustrated in FIG. 2, the RAT 14 includes an electrical generator 22 located within the interior 40 of the housing 20. The housing 20 can further include a mounting plate 21 configured to mount the RAT system 12 with a portion of the aircraft 10, for example, by way of a passage 59 of the pylon 16.

The turbine or propeller 28 can further include a turbine output shaft 30, which can be operably coupled at a first end 32 to the blades 26 such that rotation of the blades 26 rotates the turbine output shaft 30. The turbine output shaft 30 can be operably coupled to the blades 26 in any suitable manner and can project rearwardly from the blades 26 to provide a rotary output for driving an auxiliary power unit, such as the electrical generator 22. By way of non-limiting example, a the turbine output shaft 30 can include, or be rotationally coupled with a rotatable rotor shaft 34, for instance, by way of a splined relationship or other suitable mechanically coupling, such that rotation of the blades 26 is transferred through the turbine output shaft 30 to the rotor shaft 34. Embodiments of the disclosure are envisioned wherein the rotor shaft 34 is formed, machined, or manufactured from thermally conductive materials. Non-limiting example thermally conductive materials can include carbon steel or aluminum alloy. Additional thermally conductive materials or rotor shaft 34 formations can be included.

The generator 22 is located within the housing interior 40 and includes a rotor 56 rotatably and thermally coupled with the rotor shaft 34 and can further include, for instance, a set of permanent magnets 54. The set of permanent magnets 54 can define a set of magnetic poles or rotor poles of the generator 22. The generator 22 can further include a stator 55 fixed relative to the housing 20 or rotatable rotor 56 and including a set of conductive windings 57. The stator 55 can be formed from any suitable structure, such as a core comprising a wound lamination forming a slotted structure in which are received multiple conductive windings 57 that are radially or evenly spaced about the core.

When assembled, the rotor 56 is spaced apart from the stator 55, the housing 20, and the mounting plate 21 to provide for mechanical clearance during rotation. The rotor shaft 34 is rotationally supported relative to the housing, for example, on spaced bearings 38, such that rotation of the propeller 28, is configured to drive a corresponding rotation of the rotor shaft 34 and rotor 56. The rotation of the rotor 56 and set of permanent magnets 54 relative to the stator 55 and set of windings 57 is configured to generate current in the set of windings 57, which is ultimately provided to the aircraft 10, for instance, to power a set of electrical loads or systems.

During operation of the RAT system 12, the RAT 14 is extended into the airstream surrounding the aircraft 10, and airstream flowing over the blades 26 causes the propeller 28 or blades 26 to rotate. The rotation of the blades 26 causes a corresponding rotation of the turbine output shaft 30 and rotor shaft 34. The rotation of the rotor shaft 34 and rotor 56 relative to the stator 55 generates electricity for the aircraft 10. Embodiments of the generator 22 can be configured to generate, for example, alternating current (AC) power or direct current (DC) power.

While the generator 22 is generating electricity, heat can be generated in the stator 55 or rotor 56 due to, by way of non-limiting examples, eddy current losses, copper losses, or magnetic losses. If the heat is not removed from the stator 55 or rotor 56, generator 22 performance can be degraded, or generator failure can occur. Because of heat concerns, some generators 22 can include passive or active cooling features.

Passive cooling systems focus on thermal control or thermal management while using no or a very low amount of additional energy. For example, heat generated in the stator 55 or in the set of windings 57 can be thermally conducted away from the stator 55 or windings 57 by way of a thermally conductive coupling with the heat-dissipating fins 50 configured about the stator 55 or housing 20. The exposure of the set of fins 50 in the airstream (illustrated by dotted arrows 58) act to passively dissipate an amount of heat by way of thermal convection or thermal radiation to the surrounding environment.

Active cooling, in contrast with passive cooling, utilizes an additional amount of energy to effect cooling of a heat-generating component by use of an enthalpy differential. For example, some generators 22 can include a fluid (liquid or air) cooling circuit in thermal proximity to or channeled through a portion of the rotor 56 or rotor shaft 34, and configured to operably dispense a fluid (liquid or air) through the circuit, wherein the fluid absorbs a portion of the heat generated in the rotor 56 and carries it away from the module. This form of cooling actively dissipates an amount of heat by way of an increase in the enthalpy of the moving fluid.

Certain embodiments of RAT systems 12, however, are not suitable for active cooling systems. For example, cross-continental aircraft 10 can be configured to include, or be required to include, RAT systems 12 that are fully enclosed or sealed to prevent debris or contaminants from entering the RAT system 12 or interfering with the generator 22. For example, external debris such as volcanic ash can cause generator 22 performance degradation or malfunction. Such enclosing or sealing can interfere with active or passive cooling systems, such as the liquid coolant systems explained above, as such sealing can prevent, inhibit, or interfere with conventional cooling circuits or heat removal pathways. The aforementioned interference is particularly relevant in enclosed or sealed generators 22 that can only provide limited heat dissipation or removal of heat generated on, at, or about the rotor 56.

Embodiments of the disclosure can address the limited heat dissipation of removal of heat generated at the rotor 56 by including the second cooling system 70, as illustrated in FIG. 2. As shown, the thermally conductive rotor shaft 34 can be configured to extend, or be thermally coupled with another shaft that extends rearwardly and at least partially external to the RAT system 12, RAT 14, or housing 20, while still providing an enclosed or sealed RAT system 12 configuration. The external rotor shaft 74 can include or support a second set of thermally conductive blades 76, also downstream from and external to the housing 20. The second set of blades 76 are thermally coupled with the thermally conductive rotor shaft 34, 74 and operably define a heat-conduction or heat transfer pathway from the rotor 56, through the rotor shaft 34, 74, to the outside of the housing 20, and into the second set of blades 76. The second set of blades 76 are configured such that airstream (illustrated in dotted arrow 78) passing the RAT system 12 also passes the second set of blades 76 and provide for heat transfer from the blades 76 to the airstream 78.

The second set of blades 76 can be configured to include a blade shape, design, or skew, for instance relative to the airstream 78, to provide for the heat transfer from the blades 76 to the airstream 78, when exposed to the airstream 78, as described herein. In one non-limiting example, the second set of blades 76 can be configured to be skewed relative to the airstream 78 passing through the second set of blades 76 such that the heat transfer coefficient of the second cooling system 70 or second set of blades 76 is higher than or greater than the heat transfer coefficient of an unskewed set of blades. In another non-limiting example configuration, the blade shape, design, or skew can be configured to provide for heat transfer from the blades 76 to the airstream 78, wherein the airstream 78 is defined by the operating environment of a flying aircraft 10, as explained above. Additionally, the second set of blades 76 exposed to the airstream 78 can be configured such that the length that the blades 76 or rotor shaft 34 extending rearwardly from the RAT system 12, can reduce the amount of vibrations felt by, or caused on the rotor shaft 34.

The RAT system 12, RAT 14, or housing 20 can further be configured to allow increased amounts of, direction of, or configuration of airstream 78 passing the second set of blades 76, compared to a RAT system 12, RAT 14, or housing 20 without an airstream 78 configuration. For example, as illustrated, the airstreams 78 can be configured to cross, or crisscross about the second set of fan blades 76. In one non-limiting example, the heat-dissipating fins 50 can be configured to direct the airstream 58, 78, as desired. The shield 72 configured to protect the second set of blades 76 from debris can include a set of ports 80 or slots radially arranged about the second set of blades 76 and configured to allow the airstream 78 to pass through the shield 72 and across the second set of blades 76. Additionally, while the shield 72 has been illustrated with an optional back wall 82, embodiments of the disclosure envision a shield without a back wall 82.

Non-limiting example embodiments of the RAT system 12, RAT 14, and second set of blades 76 are envisioned wherein, for instance, the second set of blades 76 are rotationally coupled with the rotor shaft 34 such that the second set of blades 76 rotate with the rotor shaft 34. In this sense, the rotating exposure of the second set of blades 76 in the airstream 78 can provide heat transfer from the blades 76 to the airstream 78. Alternatively, the rotor shaft 34 can include a first gearbox with an input coupled with the shaft 34 and an output coupled with the second set of blades 76, and configured to allow for thermal conduction from the input to the output. In this alternative configuration, the gearbox can operably rotate the second set of blades 76 at a faster or slower rotational speed than the rotor shaft 34. In yet another configuration, the second set of blades 76 can be configured such that the second set of blades 76 are non-rotationally coupled with the rotor shaft 34, and are stationary (that is, non-rotating) relative to the shaft 34.

Additionally, while not illustrated, the RAT 14 or housing 20 can further include a second gearbox having a set of speed-altering gears configured in-line between the propeller 28 or turbine output shaft 30 and the rotor shaft 34. The second gearbox can be configured to drive the rotor shaft 34 or rotor 56 at a faster or slower rotational speed than the propeller 28, such that the generator 22 generates a predetermined amount or form of power for the aircraft 10. In one non-limiting example, the second gearbox can include a speed-increasing gear train to generate at least 10 kiloVolt-Amps (kVA) at 20,000 rpm in response to a predetermined rotational speed of the turbine output shaft of 6,000 rpm.

Additional embodiments of the generator 22 can further be of pancake type construction, wherein both the stator 55 and rotor 56 are larger in diameter and smaller in axial length compared to a typical RAT system. The pancake type construction is known to generate equal amounts of power as a typical RAT system at slower propeller 28 and rotor 56 rotational speeds without the need for a speed-increasing gearbox. By way of non-limiting example, a pancake type generator 22 can be configured to generate at least 30 kW at 6,000 rpm.

Figure 3:
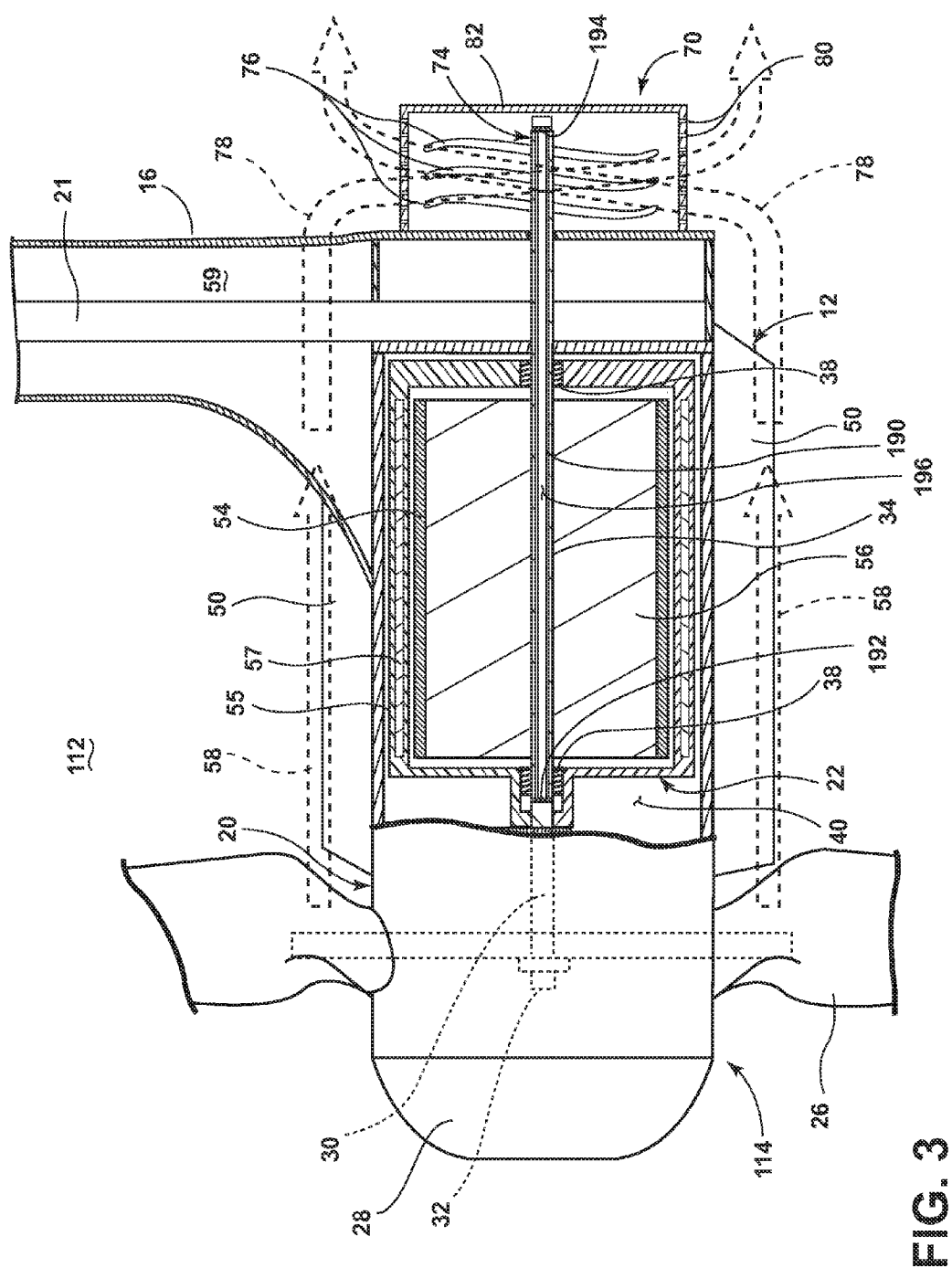
FIG. 3 is a schematic cross sectional view of the ram air turbine with integrated heat pipe, according to a second embodiment of the invention.

FIG. 3 illustrates an alternative RAT system 112 according to a second embodiment of the invention. The second embodiment is similar to the first embodiment; therefore, like parts will be identified with like numerals increased by 100, with it being understood that the description of the like parts of the first embodiment applies to the second embodiment, unless otherwise noted. A difference between the first embodiment and the second embodiment is that the rotor shaft 134 further includes a heat pipe 190 that extends along the length of the shaft 134 and thermally couples at least a portion of the rotor 56 or rotor shaft 134 with the second set of blades 76. Embodiments of the heat pipe 190 can be machined or manufactured from a same or dissimilar thermally conductive material as the rotor shaft 134, or alternatively, can be machined or manufactured such that the heat pipe 190 is integrated with the rotor shaft 134. The heat pipe 190 can be further removably or permanently affixed within the rotor shaft 134 by any mechanical mounting, friction mounting, adhesive mounting, or the like.

The heat pipe 190 can be configured in an elongated shape, such as, but not limited to, a cylinder, and include includes a first closed end 192 proximate to the propeller 28 and an opposing second closed end 194 being distal from the propeller 28, for example, extending past at least a subset of the second set of blades 76. The heat pipe 190 can have an interior 196 defining a fluid reservoir containing a phase change fluid or material (not shown), which can change from a first phase to a second phase. For example, the phase change fluid can change phases from a liquid to a gas.

The phase change fluid can be selected or configured to provide for a particular heat of vaporization, or enthalpy of vaporization, which is the combined internal energy and enthalpy change required to transform a given quality of a fluid from a liquid into a gas, at a given pressure. In this sense, the heat of vaporization of the phase change fluid defines the amount of heat absorbed by the fluid, by way of heat transfer from the rotor 56, via the rotor shaft 134, to change the phase of the fluid from a liquid to a gas, and conversely, how much heat is released from the fluid when the gas condenses back to a liquid at the second end 192, into the second set of blades 76. Furthermore, embodiments of the invention can include a sealed heat pipe 190 configuration such that the pressure within the heat pipe interior 196 can be modified to provide a selected heat of vaporization.

The particular phase change fluid or pressure within the interior 196 can be selected based on the expected temperatures to be encountered during the operation of RAT system 112 or RAT 114 to ensure the phase change will occur. For example, a non-limiting example of pressure within the reservoir can include a pressure below one standard atmosphere (1 atm). Non-limiting examples of phase change fluids that can be utilized include water, ammonia, methanol, acetone, Freon, or any combination thereof. Phase change fluids can further be selected based on their compatibilities or incompatibilities with the heat pipe 190 materials or construction.

Embodiments of the disclosure can include a heat pipe 190, or a set of heat pipes, configured with a relatively small cross-sectional area or diameter. Circulation of the working fluid inside the heat pipe relies on a centrifugal force that is generated by the rotation of the rotor shaft 134 and heat pipe 190, wherein centrifugal forces distribute condensate as a liquid stream or a liquid film. The depth of the liquid stream or the thickness of the liquid film decreases along each cylindrical wall section in the liquid flow direction. Distribution of the condensate can be aided by additional or alternative means, including but not limited to utilizing capillary action of patterned sidewalls. While the heat pipe 190 is described as having a cylinder shape, embodiments of the disclosure can include any number of cross-sectional heat pipe 190 shapes, such as a circle, a square, a triangle, an ellipse, etc.

The heat pipe 190 operates such that, in one exemplary scenario, heat generated by the rotor 56 is conductively transferred to the heat pipe 190, by way of the thermally conductive rotor shaft 34. The heat conducted to the heat pipe 190 can then be conductively transferred to, or absorbed into, the phase change fluid, which, in response to the heat transferred or absorbed, changes phases from a liquid to a gas. The phase change fluid gas, can traverse along at least a portion of the heat pipe 190 away from the rotor 56 and condense (i.e. change phase back to a liquid) along the inner patterned sidewalls of the heat pipe 190 at or near the second end 194, releasing the stored portion of the heat into the sidewall of the heat pipe 190, which can be conductively transferred by way of the rotor shaft 134 to the second set of blades 76. The heat can then, for example, be released to the airstream 78, as explained herein. The phase change fluid, again in liquid form, in turn, disperses back toward the rotor 56, along the sidewalls of the heat pipe interior 196, by, for example, the centrifugal force exerting on the returning liquid stream (or liquid film) the thickness of that decreases along the cylindrical sidewalls in the liquid flow direction, ready to absorb the additional heat.

Figure 4:
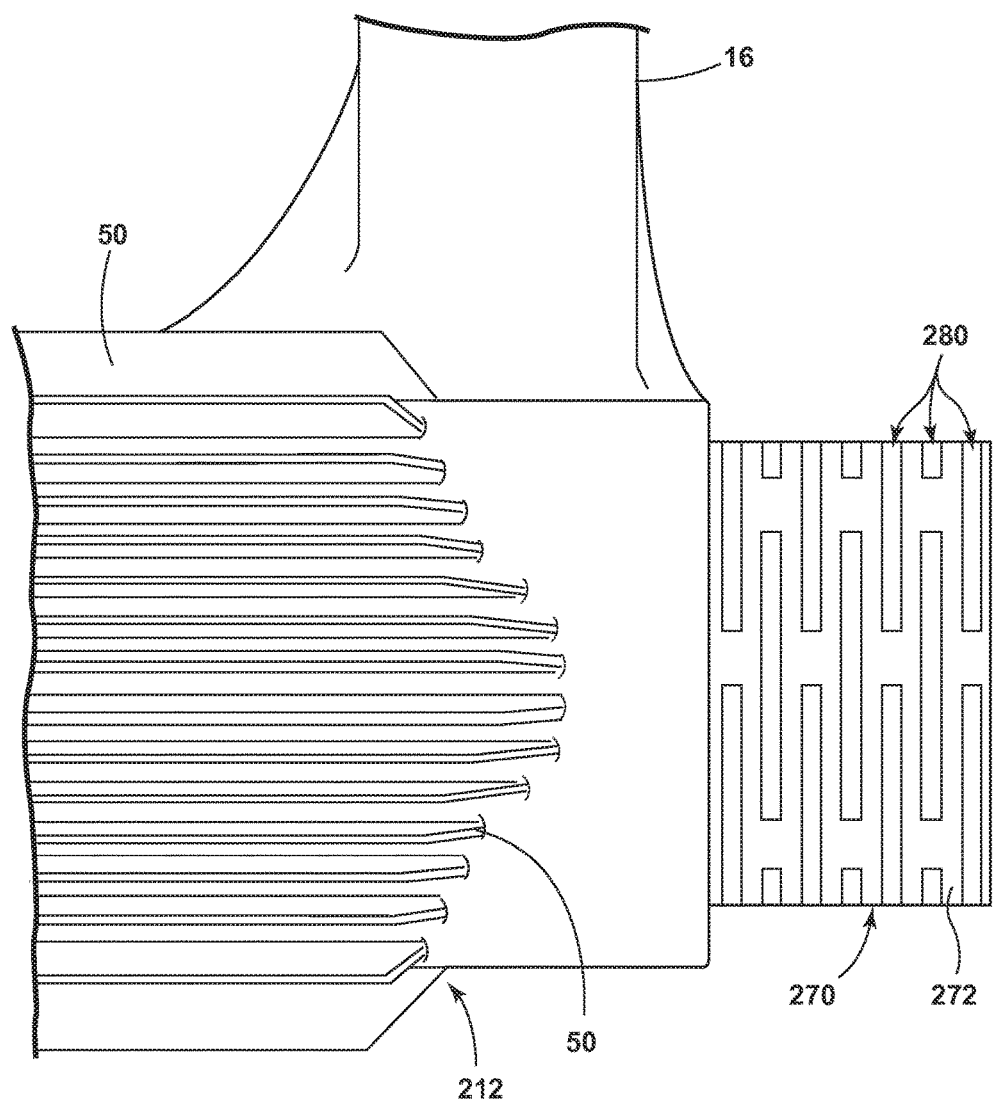
FIG. 4 is a partial side view illustrating the ram air turbine having an alternative shield configuration.
Figure 5:
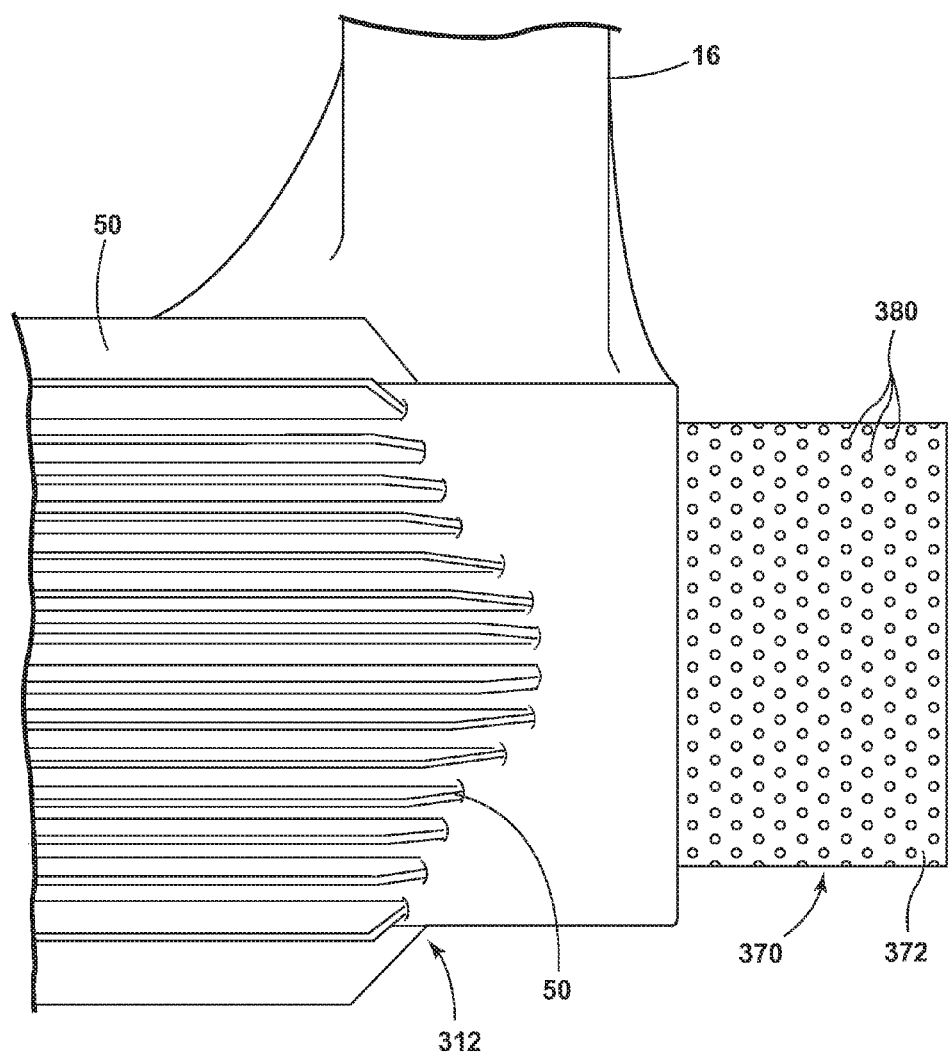
FIG. 5 is a partial side view illustrating the ram air turbine having yet another alternative shield configuration.

Many other possible embodiments and configurations in addition to that shown in the above figures are contemplated by the present disclosure. For example, FIG. 4 illustrates a partial perspective view of the second cooling system 270 and shield 272 according to third embodiment of the RAT system 212. The third embodiment is similar to the previous embodiments and like parts will be identified with like numerals increased by 200, with it being understood that the description of the like parts of the prior embodiments applies to the third embodiment, unless otherwise noted. The third embodiment is different from the previous embodiments in that the shield 272 of the third embodiment has a different configuration of the set of ports 280 or slots radially arranged about the second set of blades 76. Furthermore, FIG. 5 illustrates a partial perspective view of the second cooling system 370 and shield 372 according to fourth embodiment of the RAT system 312. The fourth embodiment is similar to the previous embodiments and like parts will be identified with like numerals increased by 300, with it being understood that the description of the like parts of the prior embodiment applies to the fourth embodiment, unless otherwise noted. The fourth embodiment is different from the previous embodiments in that the shield 372 of the fourth embodiment has a different configuration of the set of ports 380 or slots radially arranged about the second set of blades 76. As described herein, the set of ports 280, 380 illustrated in the third and fourth embodiments can be configured to allow the second set of blades 76 to be exposed to airstream 78 during flight of the aircraft 10.

Additional possible embodiments and configurations in addition to that shown in the above figures are contemplated by the present disclosure. For example, one embodiment of the disclosure contemplates configuring the RAT system 12, RAT 14, housing 20, or propeller 28 to direct the airstream 78 about the RAT system 12 in a particular pattern for exposure of the second set of blades 76. For instance, in one non-limiting example, the housing 20 or heat-dissipating fins 50 can be configured to direct the airstream 78 about the RAT system 12 into a cyclonic or vortex pattern, such that the airstream 78 swirls about the RAT system 12 and second set of blades 76, which can further increase the heat transfer coefficient of the second set of blades 76, compared to a RAT system not configured to direct the airstream. In this example configuration, the second set of blades 76 exposed to the vortex airstream pattern can be configured such that the length that the blades 76 or rotor shaft 34 extending rearwardly from the RAT system 12, can reduce the amount of vibrations felt by, or caused on the rotor shaft 34.

Another possible embodiment can include a RAT system 12 with inside-out construction, that is, wherein the rotor 56 is external to the stator 55 and rotates about the stator 55. In this embodiment, the external rotor 56 can be located within the housing 20, and be thermally and rotatably coupled with the second set of blades 76, by way of the thermally conductive shaft 34. The stator 55 can also be supported by a second shaft that is non-rotating. Alternatively, another possible embodiment can include a RAT system 12 with inside-out construction, wherein the stator 55 is thermally coupled with the second set of blades 76 whereby the exposure of the second set of blades 76 in the airstream 78 provides heat transfer from the stator 55 to the airstream 78. The second set of blades 76 can be free to rotate in response to exposure to the airstream 78, or that can be designed for heat transfer for stationary (i.e. non-rotating) exposure to the airstream 78. Yet another possible embodiment can include a RAT system 12 wherein both the rotor 56 and stator 55 are thermally coupled with the second set of blades 76, such that the second set of blades 76 provides heat transfer from the stator 55 and rotor 56 to the airstream 78.

Additional configurations or directing patterns of the airstream are envisioned. Additionally, the design and placement of the various components can be rearranged such that a number of different in-line configurations could be realized.

The embodiments disclosed herein provide a RAT system with a second, downstream, cooling system for heat generated by the rotor. One advantage that can be realized in the above embodiments is that the above described embodiments have superior cooling capabilities for heat generated by the rotor during generator operation over the conventional type RAT systems. Moreover, in particular generator or RAT configurations that prefer or require sealing for debris-proof construction (e.g. ash-proof construction), traditional rotor-cooling methods are insufficiently implemented or cannot be implemented at all (such as for liquid cooling). The buildup of heat in conventional systems would likely result in reduced generator performance, generator failure, or sealing or insulating material failure.

With the proposed rearward rotor cooling solution, heat generated at the rotor can be transferred along the length of the rotor shaft and dissipated into the airstream by the second set of blades, which can be configured, as explained above, to cool the rotor and rotor shaft. Embodiments of the disclosure that include a heat pipe can further increase the transmission of the heat along the length of the rotor. Additionally, the configuration of the RAT system can direct the airstream in a predetermined pattern, such as in a crisscrossing, cyclonic, or vortex patterns, to expose the second set of blades and create a higher heat transfer coefficient of the second cooling system.

When designing aircraft components, important factors to address are size, weight, and reliability. The above described RAT systems can be configured to include a smaller generator operating a higher power density or efficiency, and at a lower operating temperature compared to a conventional sealed RAT system. This results in a lower weight, smaller sized, increased performance, and increased reliability system. The lower number of parts and reduced maintenance will lead to a lower product costs and lower operating costs. Reduced weight and size correlate to competitive advantages during flight.

This written description uses examples to disclose the invention, including the best mode, and also to enable any person skilled in the art to practice the invention, including making and using any devices or systems and performing any incorporated methods. The patentable scope of the invention is defined by the claims, and can include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A ram air turbine system comprising:
   a thermally conductive rotatable shaft;
   a housing having a body defining an interior;
   a generator located within the interior and having a stator and a rotor, wherein the rotor is operably and thermally coupled with the rotatable shaft;
   a turbine having a first set of blades operably coupled with the rotatable shaft and configured such that an airstream passing through the first set of blades rotates the rotatable shaft;
   a cooling system coupled to the housing and having a shield element with a set of ports and having a back wall with at least a portion of the rotatable shaft extending into the shield element; and
   a second set of blades mounted on the rotatable shaft and enclosed within the shield element and the back wall, and arranged radially interior of the set of ports relative to the rotatable shaft, and rotatable coaxially with and in fluid communication with the first set of blades, arranged downstream from, and external to the housing, wherein the second set of blades are thermally coupled with the shaft and configured such that airstream passing through the first set of blades passes to the second set of blades provide for heat transfer to the airstream.

2. The ram air turbine system of claim 1 wherein the thermally conductive rotatable shaft further includes a heat pipe.

3. The ram air turbine system of claim 1 wherein the housing is sealed to prevent external debris from entering the interior.

4. The ram air turbine system of claim 3 wherein the housing is sealed to prevent volcanic ash from entering the interior.

5. The ram air turbine system of claim 1 wherein the second set of blades rotate with the rotatable shaft.

6. The ram air turbine system of claim 5 wherein the second set of blades are supported by the rotatable shaft, and wherein a portion of the rotatable shaft is external to the housing.

7. The ram air turbine system of claim 1 wherein the second set of blades are skewed relative to the airstream passing through the second set of blades such that the heat transfer coefficient of the second set of blades is higher than an unskewed set of blades.

8. The ram air turbine system of claim 1 wherein the housing body is configured to direct an airstream through the second set of blades.

9. The ram air turbine system of claim 8 wherein the housing body is further configured to generate an airstream vortex through the second set of blades.

10. A heat exchanger for a ram air turbine generator, comprising:
    a stator having a set of windings;
    a rotor having a set of permanent magnets and configured to rotate relative to the stator to generate a current in the set of windings;
    a first set of blades operably coupled with the rotor;
    a cooling system coupled to the rotor and having a shield element with a set of ports and having a back wall with a rotatable shaft coupled to the rotor extending into the shield element; and
    a second set of blades rotatably mounted on the rotor and provided within the shield element, rotatable coaxially with and in fluid communication with the first set of blades, thermally coupled with at least one of the stator or the rotor by way of a thermally conductive shaft, and configured such that the second set of blades are exposed to an airstream passing the ram air turbine generator;
    wherein the heat exchanger conducts heat from the at least one of the stator or the rotor, through the thermally conductive shaft, to the second set of blades, and whereby exposure of the second set of blades in the airstream provides heat transfer to the airstream.

11. The heat exchanger of claim 10 wherein the rotor rotates external to the stator.

12. The heat exchanger of claim 11 where the second set of blades are rotationally coupled with the rotor by way of the thermally conductive shaft, and whereby the rotating exposure of the second set of blades in the airstream provides heat transfer from the rotor to the airstream.

13. The heat exchanger of claim 11 wherein the second set of blades are thermally coupled with the stator by way of the thermally conductive shaft and whereby the exposure of the second set of blades in the airstream provides heat transfer from the stator to the airstream.

14. The heat exchanger of claim 13 wherein the second set of blades are configured to rotate in the airstream.

15. The heat exchanger of claim 10 further including a housing having a body defining an interior, wherein the stator and a portion of the rotor are located within the interior, and wherein the housing is sealed to prevent external debris from entering the interior.

16. An aircraft comprising:
a ram air turbine generator including:
a thermally conductive rotatable shaft;
a housing having a body defining an interior;
a generator located within the interior and having a stator and a rotor, wherein the rotor is operably and thermally coupled with the rotatable shaft;
a turbine having a first set of blades operably coupled with the rotatable shaft and configured such that an airstream passing through the first set of blades rotates the rotatable shaft;
a cooling system coupled to the housing and having a shield element with a set of ports and having a back wall with at least a portion of the rotatable shaft extending into the shield element; and
a second set of blades mounted to the rotatable shaft and provided within the shield element, rotatable coaxially with and in fluid communication with the first set of blades, arranged downstream from, and external to the housing, wherein the second set of blades are thermally coupled with the shaft;
wherein airstream flowing about the ram air turbine generator passing through the second set of blades provide for heat transfer from the second set of blades to the airstream.

17. The aircraft of claim 16 wherein the thermally conductive rotatable shaft further includes a heat pipe.

18. The aircraft of claim 16 wherein the second set of blades are skewed relative to airstream passing through the second set of blades such that the heat transfer coefficient of the second set of blades is higher than an unskewed set of blades.

19. The aircraft of claim 16 wherein the housing body is configured to direct airstream through the second set of blades.

* * * * *